(No Model.)
J. D. GAWN.
COUPLING HOOK.
No. 367,969. Patented Aug. 9, 1887.
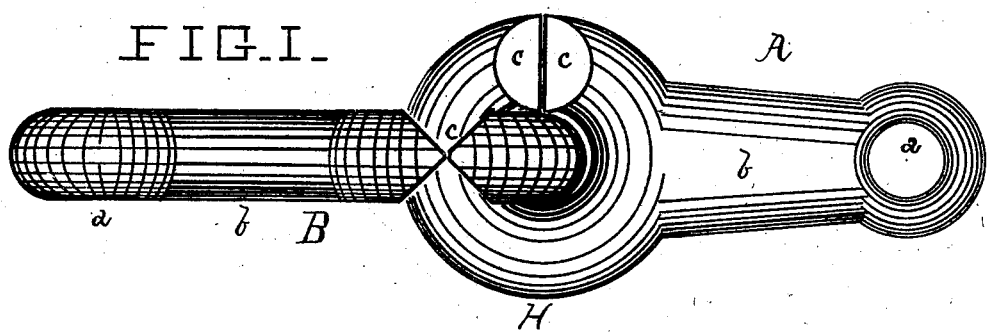
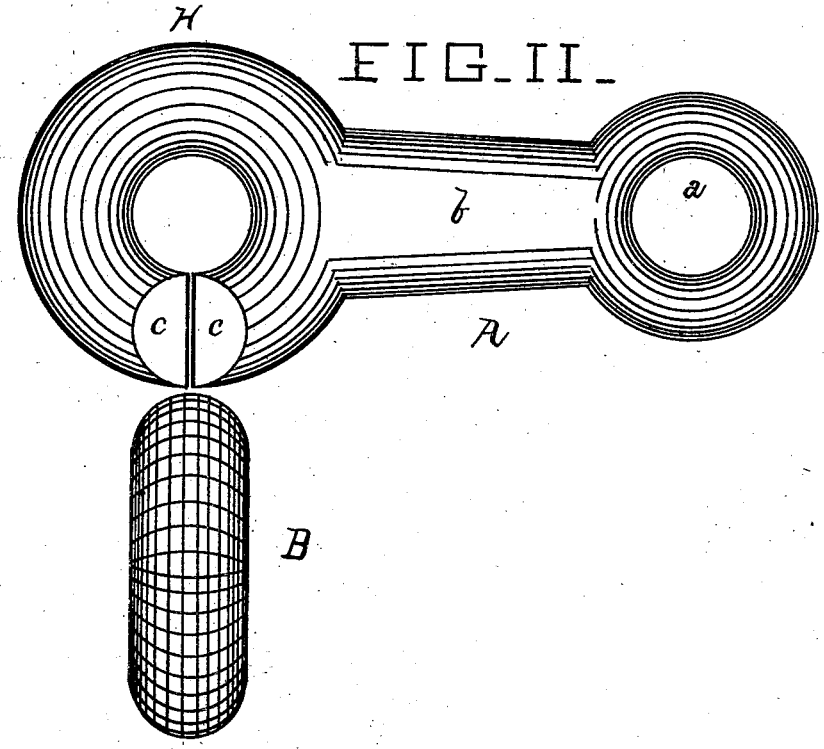
Witnesses.
Alice E. Bruer.
John Blanchard
Inventor.
James D Gawn
by W. L. Fay his atty

UNITED STATES PATENT OFFICE.

JAMES D. GAWN, OF NORTH AMHERST, OHIO.

COUPLING-HOOK.

SPECIFICATION forming part of Letters Patent No. 367,969, dated August 9 1887.

Application filed March 21, 1887. Serial No. 231,728. (No model.)

*To all whom it may concern:*

Be it known that I, JAMES D. GAWN, a citizen of the United States, residing at North Amherst, in the county of Lorain and State of Ohio, have invented a new and useful Coupling-Hook, of which the following is a specification.

My invention relates to improvements in coupling-hooks in which a pair of hooks are used, each being the exact size, form, and shape of the other; and the object of my invention is to provide such coupling-hooks as will be light, strong, durable, easily coupled or uncoupled when desired, and not liable to be detached in ordinary use. I attain these objects by means of the mechanism illustrated in the accompanying drawings, in which—

Figure I is a view showing the hooks and their position when coupled together. Fig. II shows the hooks in position for coupling.

Similar letters refer to similar parts throughout the several views.

A and B represent two hooks, which are identical in form, size, and construction, and may be of any material.

$a$ represents an eye formed in the back end of the hooks for the convenience of attaching them to a rope, chain, or other desired object.

$b$ represents a shank to the hooks.

H represents the head or hook proper, which I prefer to make of the form shown in the drawings—that is, in the form of a ring the diameter of the hole in the center of which is made just enough larger than the diameter of the material forming the head to permit the one working in the other freely.

At any place, preferably on one side the head, the hooks are cut through to a point a very small distance beyond the center from each side, as represented at $c c$, the sides of said cut forming with each other an angle of ninety degrees and with the sides of said head an angle of forty-five degrees.

Each hook is made and cut exactly alike, and in order to couple one with the other the openings in each are turned together and the hooks held at right angles to each other, when the parts $c c$ of one hook will enter and pass through the opening made by the cut hereinbefore described.

When one hook has been passed into the other, it is perfectly free to turn in any direction, and can only be uncoupled by reversing the operation of coupling. The position in which it is necessary to bring the hooks to uncouple is one that will not take place in ordinary use. By reason of the construction the hooks are very small in proportion to their strength, uncouple and couple very easily when brought into proper position, and are perfectly safe from uncoupling while in use.

Having fully described my invention, what I claim, and desire to secure by Letters Patent of the United States, is—

The combination of the two herein-described hooks of the same shape and form, each of which is provided with a single opening, with the ends forming the opening nearly meeting in the center and cut back at an angle of forty-five degrees from opposite sides, all as above set forth, and substantially as described.

JAMES D. GAWN.

Witnesses:
   E. G. JOHNSON,
   ALICE F. BRUCE.